(12) United States Patent
Yin

(10) Patent No.: US 10,104,661 B2
(45) Date of Patent: Oct. 16, 2018

(54) ADAPTIVELY SELECTING FROM AMONG MULTIPLE BASE STATIONS

(71) Applicant: Empire Technology Development LLC, Wilmington, DE (US)

(72) Inventor: Xuefeng Yin, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 28 days.

(21) Appl. No.: 14/372,958

(22) PCT Filed: Jan. 22, 2014

(86) PCT No.: PCT/CN2014/071115
§ 371 (c)(1),
(2) Date: Jul. 30, 2015

(87) PCT Pub. No.: WO2015/109457
PCT Pub. Date: Jul. 30, 2015

(65) Prior Publication Data
US 2016/0198464 A1    Jul. 7, 2016

(51) Int. Cl.
*H04W 48/20* (2009.01)
*H04W 72/04* (2009.01)
*H04B 17/318* (2015.01)

(52) U.S. Cl.
CPC ...... *H04W 72/0453* (2013.01); *H04B 17/318* (2015.01); *H04W 48/20* (2013.01)

(58) Field of Classification Search
CPC . H04B 17/318; H04W 48/20; H04W 72/0453
See application file for complete search history.

(56) References Cited

U.S. PATENT DOCUMENTS

| 4,771,289 A | 9/1988 | Masak |
| 5,463,401 A | 10/1995 | Iwasaki |
| 6,950,061 B2 | 9/2005 | Howell |
| 7,109,937 B2 | 9/2006 | Iluz |
| 7,277,730 B2 | 10/2007 | Ylitalo |

(Continued)

FOREIGN PATENT DOCUMENTS

| CN | 1585297 A | 2/2005 |
| CN | 101094021 A | 12/2007 |

(Continued)

OTHER PUBLICATIONS

Bhagavatula, R. & Heath, R., Jr. , "Adaptive Limited Feedback for Sum-Rate Maximizing Beamforming in Cooperative Multicell Systems," Signal Processing, IEEE Transactions on, Feb. 2011, vol. 59, No. 2, pp. 800-811

(Continued)

*Primary Examiner* — Andrew Lai
*Assistant Examiner* — M Mostazir Rahman

(57) ABSTRACT

In a wireless communication system, a wireless communication device equipped with multiple antennae may be located in an area covered by more than one base station. The wireless communication device may be configured to measure a respective channel gain of multiple channels between the wireless communication device and the base stations and, further, to select a base station in accordance with the channel gains to communicate with.

14 Claims, 4 Drawing Sheets

(56) References Cited

U.S. PATENT DOCUMENTS

| | | | |
|---|---|---|---|
| 7,339,520 | B2 | 3/2008 | Chang |
| 7,522,114 | B2 | 4/2009 | Brown et al. |
| 7,587,173 | B2 | 9/2009 | Hoffman et al. |
| 7,880,675 | B1 | 2/2011 | Paschen |
| 7,956,806 | B2 | 6/2011 | Liu |
| 8,204,507 | B2 | 6/2012 | Yu et al. |
| 8,378,922 | B1 | 2/2013 | Hayles, Jr. et al. |
| 8,515,493 | B1 | 8/2013 | Jensen et al. |
| 8,604,982 | B2 | 12/2013 | Achour et al. |
| 8,610,632 | B2 | 12/2013 | Zhang et al. |
| 8,699,372 | B2 | 4/2014 | Guo |
| 2003/0179138 | A1 | 9/2003 | Chen |
| 2006/0256014 | A1 | 11/2006 | Sengupta et al. |
| 2007/0105594 | A1 | 5/2007 | Burkert et al. |
| 2008/0076477 | A1* | 3/2008 | Hedayat ............... H04B 7/0617 455/562.1 |
| 2010/0073232 | A1 | 3/2010 | Sajuyigbe et al. |
| 2010/0265968 | A1* | 10/2010 | Baldemair .......... H04L 27/2662 370/503 |
| 2013/0121187 | A1* | 5/2013 | Das ................... H04W 36/0083 370/252 |
| 2014/0031046 | A1* | 1/2014 | Wong ................... H04W 36/18 455/442 |

FOREIGN PATENT DOCUMENTS

| | | |
|---|---|---|
| CN | 101237267 A | 8/2008 |
| CN | 101501927 A | 8/2009 |
| CN | 103050780 A | 4/2013 |
| CN | 103259558 A | 8/2013 |
| CN | 203180083 U | 9/2013 |
| JP | 1997138266 A | 5/1997 |
| JP | 2003248671 A | 9/2003 |
| JP | 2006203920 A | 8/2006 |
| JP | 2006211328 A | 8/2006 |
| JP | 2007081825 A | 3/2007 |
| JP | 2007525065 A | 8/2007 |
| JP | 2009138266 A | 6/2009 |
| JP | 2009535942 A | 10/2009 |
| KR | 20020032253 A | 5/2002 |
| WO | 9836595 A | 8/1998 |
| WO | 2004114546 A1 | 12/2004 |
| WO | 2007127955 A2 | 11/2007 |
| WO | 2008115881 A1 | 9/2008 |
| WO | 2010130166 A | 11/2010 |

OTHER PUBLICATIONS

Gaokar, R. and Cheeran, A., Dr., "Performance Analysis of Beamforming Algorithms," IJECT, vol. 2, No. 1, Mar. 2011, pp. 43-48

International search report and written opinion for PCT Publication No. PCT/CN2014/071115 filed on Jan. 22, 2014.

Razavilar et al., "Joint beamforming and handoff for traffic improvements in wireless networks," Communications, 1999, ICC '99, 1999 IEEE International Conference on, 1999, vol. 1, pp. 41-45.

Joon-Sang Park et al., "Space-Mac: Enabling Spatial Reuse using MIMO channel-aware MAC," Communications, 2005 IEEE International Conference on, May 16-20, 2005, vol. 5, pp. 3642-3646.

Abdulrazak et al., "New Algorithm to Improve the Coexistence between IMT-Advanced Mobile Users and Fixed Satellite Service," 2009 International Conference on Machine Learning and Computing, IPCSIT, (2011) IACSIT Press, Singapore, vol. 3, pp. 294-301.

"Maximizing LTE Performance Through MIMO Optimization," Pctel, White Paper, pp. 1-14 (Apr. 2011).

Bartlett, M., "Smoothing periodograms from time series with continuous spectra," Nature, vol. 161, pp. 686-687 (1948).

Fleury, B. H., "Channel Parameter Estimation in Mobile Radio Environments Using the SAGE Algorithm," IEEE Journal on Selected Areas in Communications, vol. 17, No. 3, pp. 434-450 (1999).

International search report and written opinion for PCT Application No. PCT/CN2010/074051 dated Mar. 24, 2011.

Modelski, J. & Yashchyshyn, Y., "Voltage-controlled ferroelectric microstrip antenna for phased arrays," Antennas and Propagation Society International Symposium, vol. 2, pp. 506-509 (2000).

Wang, P., "Frequency-fixed beam-scanning leaky-wave antenna based on composite left-right transmission line," Master thesis, Tongji University, (2008).

Xie, N., et al., "Multi-pair Physical Layer Network Coding with Beamforming Systems," IEEE Wireless Communications and Networking Conference (WCNC), pp. 1-5 (2012).

Yin, X. et al., "Tracking of Time-Variant Radio Propagation Paths Using Particle Filtering," IEEE International Conference on Communications, pp. 920-924 (2008).

"New EU project on ferroelectric films," Nanotechwire.com, accessed at http://www.nanotechwire.com/news.asp?nid=2701&ntid=115&pg=103, posted on Dec. 18, 2005, pp. 2.

International Search Report for International Application No. PCT/CN2013/083067, dated Jun. 4, 2014.

Wang, Y., et al., "Direct observation of negative phase velocity and positive group velocity in time domain for composite right/left-handed transmission lines," Journal of Applied Physics, vol. 100, Issue 11, pp. 113503-1-113503-4 (Dec. 2006).

\* cited by examiner

ADAPTIVELY SELECTING FROM AMONG MULTIPLE BASE STATIONS

CROSS-REFERENCE TO RELATED APPLICATION

This Application is a U.S. National Stage filing under 35 U.S.C. § 371 of International Application No. PCT/CN2014/071115, filed on Jan. 22, 2014. The disclosure of International Application No. PCT/CN2014/071115 is hereby incorporated herein by reference in its entirety.

TECHNICAL FIELD

The technologies described herein pertain generally to adaptively selecting from among multiple available base stations to facilitate communications.

BACKGROUND

Unless otherwise indicated herein, the approaches described in this section are not prior art to the claims in this application and are not admitted to be prior art by inclusion in this section.

In a wireless communication system, a wireless communication device equipped with multiple antennae may be located in an area serviced by more than one base station. The wireless communication device may select one of the base stations to facilitate communications via communication channels by directing multiple wireless signals transmitted from the respective multiple antennae towards the selected base station.

SUMMARY

Technologies are generally described for adaptively selecting from among multiple base stations. The various techniques described herein may be implemented in various systems, methods and/or computer-readable mediums.

In some examples, various embodiments may be implemented as systems. Some systems may include a first base station; a second base station; and a mobile communication device including multiple antennae in communication with the first base station and the second base station, and configured to: calculate an impulse response of one or more channels between each of the multiple antennae of the mobile communication device and, respectively, the first base station and the second base station, compute a narrowband channel coefficient of the one or more channels; calculate a weight vector for the impulse responses of the one or more channels for each of the multiple antennae using the narrowband channel coefficient computed, to control signal transmission to, respectively, the first base station and the second base station through the one or more channels.

In some examples, various embodiments may be implemented as methods. Some methods may include measuring an impulse response of one or more channels between multiple antennae and a first base station and a second base station; computing a narrowband channel coefficient of the one or more channels for signal transmission to the first base station and the second base station; and calculating a weight vector for the impulse responses of the one or more channels for each of the multiple antennae using the narrowband channel coefficient, to control signal transmission to the first base station and the second base station, respectively, through the one or more channels.

In some examples, various embodiments may be implemented as computer-readable mediums having executable instructions stored thereon. Some computer-readable mediums may store instructions that, when executed, cause one or more processors to perform operations comprising measuring a first impulse response of a first transmission channel between a first antenna of the mobile communication device and a first base station; measuring a second impulse response of a second transmission channel between at least a second antenna of the mobile communication device and a second base station; computing a narrowband channel coefficient of first transmission channel and the second transmission channel; and calculating a first weight vector for the first base station and a second weight vector of the second base station, to control signal transmission through the first transmission channel and the second transmission channel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
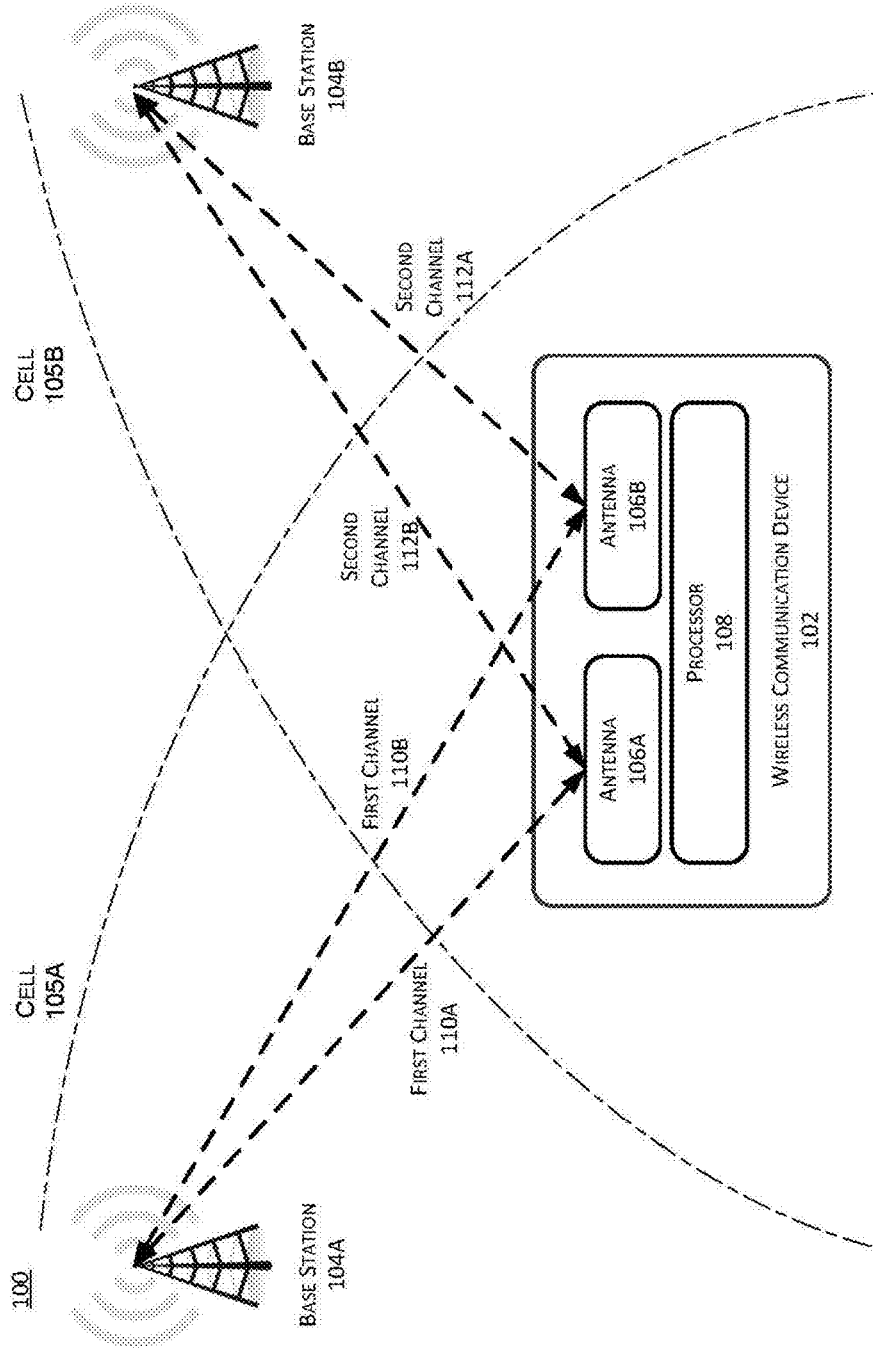
FIG. 1 shows an example system in which adaptively selecting from among multiple base stations may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which adaptively selecting from among multiple base stations may be implemented, arranged in accordance with at least some embodiments described herein. As depicted, example system 100 may include, at least, a wireless communication device 102 and multiple base stations 104A and 104B, each of which may respectively support wireless communication between multiple embodiments of wireless communication device 102 within cell 105A and cell 105B. Wireless communication device 102 may include multiple antennae 106A and 106B and a processor 108. Each of antennae 106A and 106B may be configured to communicate with one of base stations 104A and 104B respectively via multiple first channels 110A and 110B and multiple second channels 112A and 112B. Unless context requires specific reference to one of first channels 110A and 110B and second channels 112A and 112B, collective reference may be made to "first channels 110" and "second channels 112."

Wireless communication device 102 may refer to a physical communication device capable of establishing at least one communication channel with one or both of base station 104A and base station 104B and transceiving data over the established channels. Non-limiting examples of such data may include text data, voice data, video stream data, etc. Non-limiting examples of wireless communication device 102 may include mobile phones, tablets, laptop computers, etc.

Base stations 104A and 104B may each refer to respective embodiments of communication equipment that, in combination, may be configured to support or facilitate wireless communication between one or more embodiments of wireless communication device 102 and/or other base stations, within a cell. As referenced herein, a "cell" may refer to a range of radio coverage in a respective cellular network. Such communication may be supported or facilitated in accordance with different wireless communication standards including Time Division Duplexing Long Term Evolution (TDD-LTE), Frequency Division Duplexing FDD-LTE, IEEE 802.15.4, Global System for Mobile Communications (GSM), Code Division Multiple Access (CDMA) and etc. Such examples are not intended to be limiting, and therefore should not be interpreted to be so. Unless context requires specific reference to one of base stations 104A and 104B, collective reference may be made to "base stations 104." Notably, the example system may include more than two base stations and corresponding cells.

Cell 105A and 105B may respectively refer to a range of radio coverage in a respective cellular network. Cell 105A and 105B may each be configured, by a common entity or by separate entities, to provide wireless communication for wireless communication devices therein, and may further be equipped with base stations 104 respectively.

Antennae 106A and 106B may respectively refer to a component or module of wireless communication device 102, implemented as hardware, firmware, or combination thereof, that may be configured to convert electric power into electromagnetic waves, and vice versa; and to transceive wireless signals in a form of electromagnetic waves to enable wireless communications for wireless communication device 102. In some examples, antennae 106A and 106B may be configured to collaboratively form multiple wireless signal beams that are projected in a preferred direction towards one of base stations 104. Unless context requires specific reference to one of antennae 106A and 106B, collective reference may be made to "antennae 106."

Processor 108 may refer to a hardware component of wireless communication device 102 that may be configured to perform quality-assurance tasks. Non-limiting examples of such tasks may include testing the quality of multiple first channels 110A and 110B and multiple second channels 112A and 112B, determining which of the channels to utilize for the wireless communication with another embodiment of wireless communication device 102, and controlling antennae 106 to direct the multiple wireless signal beams towards one of base stations 104 corresponding to the determined channels. For example, processor 108 may be configured to control antennae 106A and 106B to direct the multiple wireless signal beams towards base station 104A via first channel 110A and 110B. In some examples, processor 108 may be configured to execute multiple software modules for performing the above-mentioned computing tasks. The software modules are described in detail in accordance with FIG. 2.

First channels 110A and 110B and second channels 112A and 112B may respectively refer to a communicative connection between one of base stations 104 and a corresponding one of antennae 106. A communication quality of a respective channel may vary due to the position of wireless communication device 102, physical obstacles between wireless communication device 102 and a corresponding one of base stations 104, radio interference, etc. For example, the communication quality of channel 110A may be measured by comparing a standard signal transmitted by base station 104A and a signal received by antenna 106A in response to the standard signal. As the position of wireless communications device 102 may frequently change relative to base stations 104, the communication quality of one or more of channels 110 and 112 being used may deteriorate and the communication quality of another one or more of channels 110 and 112 may improve. Thus, processor 108 may be configured to adaptively select one of base stations 104 to facilitate communications for wireless communication device 102, or to switch from one to another of base stations 104. That is, processor 108 may make the selection or switch in accordance with the changing communication quality of one or more of first channels 110A and 110B and second channels 112A and 112B, so that wireless communication device 102 may maintain current wireless communication, facilitated by a respective one of base stations 104 via a channel that provides better communication quality than the other.

Figure 2:
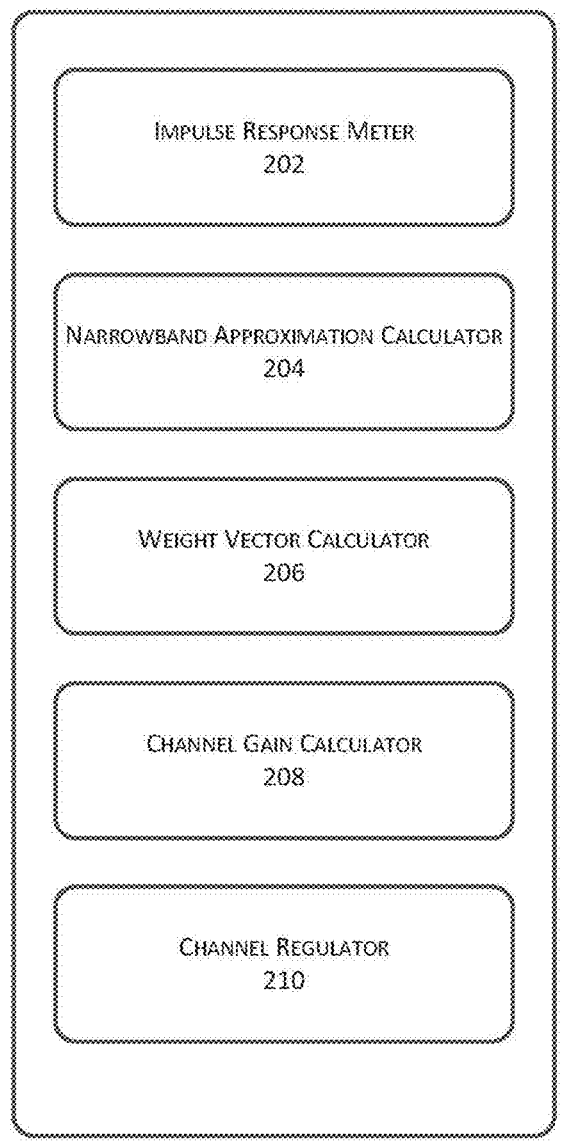
FIG. 2 shows an example configuration of a wireless communication device by which adaptively selecting from among multiple base stations may be implemented.

FIG. 2 shows an example configuration 200 of a wireless communication device by which adaptively selecting from among multiple base stations may be implemented, arranged in accordance with at least some embodiments described herein. As depicted, example configuration 200 may include, at least, an impulse response calculator 202, a narrowband channel coefficient calculator 204, a weight vector calculator 206, a channel gain calculator 208, and a channel regulator 210.

Impulse response calculator 202 may refer to a software module, hosted on wireless communication device 102, which may be configured to calculate an impulse response of each channel between each of antennae 106 and each of base stations 104. As referenced herein, impulse response may refer to a signal received by wireless communication device 102, in response to a standard impulse signal transmitted by a respective one of base stations 104, via a respective one of first channels 110 and second channels 112. The standard impulse signal, i.e., the unit impulse symbol, may refer to a signal takes value of 1 at zero and takes value of 0 elsewhere in a time domain. The impulse response with respect to each of first channels 110 and second channels 112 may be represented as $$h_i(\tau) = \begin{bmatrix} h_{i,A}(\tau) \\ h_{i,B}(\tau) \end{bmatrix}, i = 1, 2,$$

wherein τ represents a variable of time; i represents different ones of base stations 104; and A and B represent respective ones of antennae 106. Notably, in an example system in which more than two base stations exist, the impulse response may simply be extended as $$h_i(\tau) = \begin{bmatrix} h_{i,A}(\tau) \\ h_{i,B}(\tau) \end{bmatrix}, i = 1, 2, 3, \text{etc.}$$

Further, in an example system in which wireless communication device 102 includes more than two antennae, the impulse response may be extended as $$h_i(\tau) = [h_{i,B}(\tau)], \begin{matrix} h_{i,A}(\tau) \\ \\ h_{i,C}\tau \end{matrix}$$

where "C" denotes a third antenna. The calculation based on the impulse responses described throughout this invention can all be extended to the cases with more than two base stations present, and/or more than two antennas installed in wireless communication device 102.

Narrowband channel coefficient calculator 204 may refer to a software module, hosted on wireless communication device 102, that may be configured to calculate a narrowband channel coefficient for each of first channels 110 and second channels 112. The narrowband channel coefficient may be used to describe one or more characteristics of corresponding channels and may be computed by an integral of a respective one of the impulse responses during a predetermined time period, e.g., a cycle of the wireless signals. The narrowband channel coefficient may be represented as $h_i = \int_0^T h_i(\tau)d\tau, i=1,2$, wherein T represents the period of the wireless signals.

Weight vector calculator 206 may refer to a software module, hosted on wireless communication device 102, which may be configured to calculate a weight vector based on the narrowband channel coefficient of first channels 110 and second channels 112. The calculated weight vector may be so composed to emphasize the contribution of respective ones of the channels more than other channels in the communication and, further, to direct the wireless signals to one of base stations 104 and to suppress the wireless signals to another of base stations 104. A first weight vector, $w_1$, may be represented as $w_1 = h_1^H(I - h_2 h_2^H/(h_2^H h_2))$; a second weight vector, $w_2$, may be represented as $w_2 = h_2^H(I - h_1^H/(h_1^H h_1))$, wherein I represents an identity matrix and the superscript H means the conjugate transpose of a matrix.

Channel gain calculator 208 may refer to a software module, hosted on wireless communication device 102, that may be configured to calculate a channel gain for each of first channels 110 and second channels 112 in relation to, respectively, one of base stations 104. The calculated channel gain may indicate a communication quality of the wireless communication with the respective base stations and may be computed and represented as $g_i = |w_i^H h_i|^2, i=1,2$. Further, processor 108 may be configured to select one of base stations 104, as a target base station, corresponding to a maximum value of the channel gains.

Channel regulator 210 may refer to a software module hosted on wireless communication device 102, that may be configured to control antennae 106 to direct signal transmission towards the target base station, i.e., the one of base stations 104 for which the maximum channel gain has been calculated, when signal transmission towards others of base station 104 may be suppressed in accordance with weight vectors.

Thus, example configuration 200 may include impulse response calculator 202, narrowband channel coefficient calculator 204, weight vector calculator 206, channel gain calculator 208, and channel regulator 210, to select one from among base stations 104 that corresponds to a maximum channel gain value and direct the signal transmission towards the selected base station.

Figure 3:
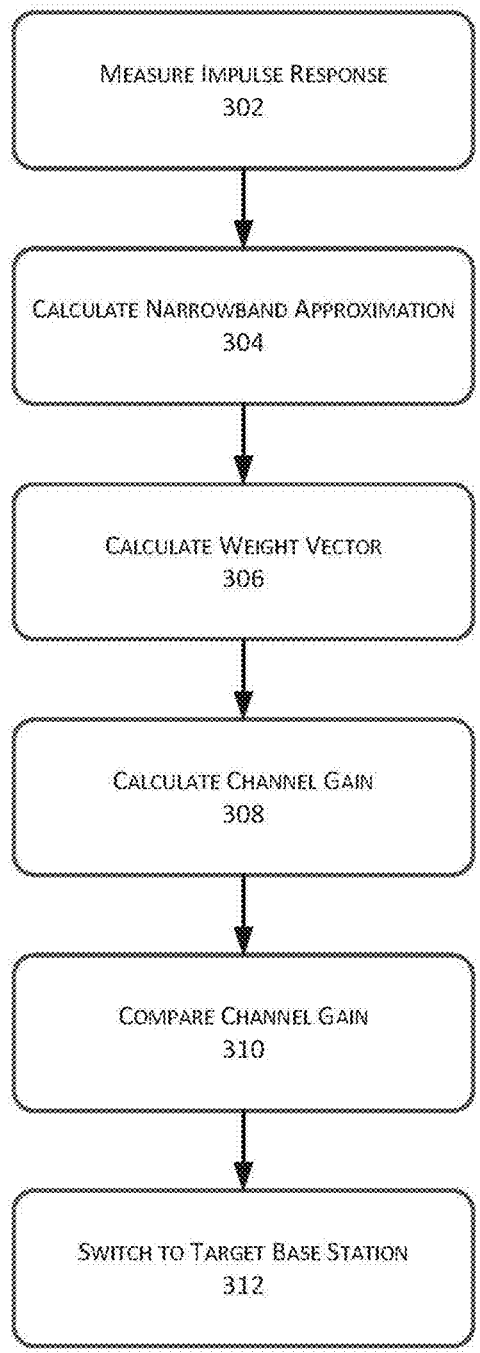
FIG. 3 shows an example configuration of a processing flow of operations by which adaptively selecting from among multiple base stations may be implemented.

FIG. 3 shows an example configuration of a processing flow of operations by which adaptively selecting from among multiple base stations may be implemented, arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, and/or 312. Processing may begin at block 302.

Block 302 (Calculate Impulse Response) may refer to impulse response calculator 202 measuring an impulse response of a respective on of first channels 110 and second channels 112 between each of antennae 106 and each of base stations 104. The impulse response with respect to each of first channels 110 and second channels 112 may be represented as $$h_i(\tau) = \begin{bmatrix} h_{i,A}(\tau) \\ h_{i,B}(\tau) \end{bmatrix}, i = 1, 2,$$

wherein τ represents a variable of time; i represents different ones of base stations 104; A and B represent respective ones of antennae 106. Processing may continue from block 302 to block 304.

Block 304 (Calculate Narrowband channel coefficient) may refer to narrowband channel coefficient calculator 204 calculating a narrowband channel coefficient for each of first channels 110 and second channels 112. The narrowband channel coefficient may be used to describe one or more characteristics of corresponding channels and may be computed by an integral of a respective one of the impulse responses during a predetermined time period, e.g., the period of the wireless signals. The narrowband channel coefficient may be represented as $h_i = \int_0^T h_i(\tau)d\tau$, i=1, 2, wherein T represents the period of the wireless signals. Processing may continue from block 304 to block 306.

Block 306 (Calculate Weight Vector) may refer to weight vector calculator 206 calculating a weight vector based on the narrowband channel coefficient of first channels 110 and second channels 112. The weight vector may so composed to emphasize the contribution of respective ones of the channels more than other channels in the communication and, further, to direct the wireless signals to one of base stations 104 and to suppress the wireless signals to another of base stations 104. A first weight vector, $w_1$, may be represented as $w_1 = h_1^H(I - h_2 h_2^H/(h_2^H h_2))$; a second weight vector, $w_2$, may be represented as $w_2 = h_2^H(I - h_1 h_1^H/(h_1^H h_1))$, wherein I represents an identity matrix and the superscript H means the conjugate transpose of a matrix. Processing may continue from block 306 to block 308.

Block 308 (Calculate Channel Gain) may refer to channel gain calculator 208 calculating a channel gain for each of first channels 110 and second channels 112 in relation to, respectively, one of base stations 104. The channel gain may be calculated and represented as $g_i = |w_i^H h_i|^2$, i=1, 2. Processing may continue from block 308 to block 310.

Block 310 (Compare Channel Gain) may refer to processor 108 comparing the multiple gains and selecting one from base stations 104, as a target base station, which corresponds to a maximum value of the channel gains. Processing may continue from block 310 to block 312.

Block 312 (Switch to Target Base Station) may refer to channel regulator 210 controlling antennae 106 to direct signal transmission towards the target base station, i.e., one of base stations 104 that corresponds to the maximum value of the channel gains, and suppressing signal transmission towards others of base station 104 in accordance with weight vectors.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
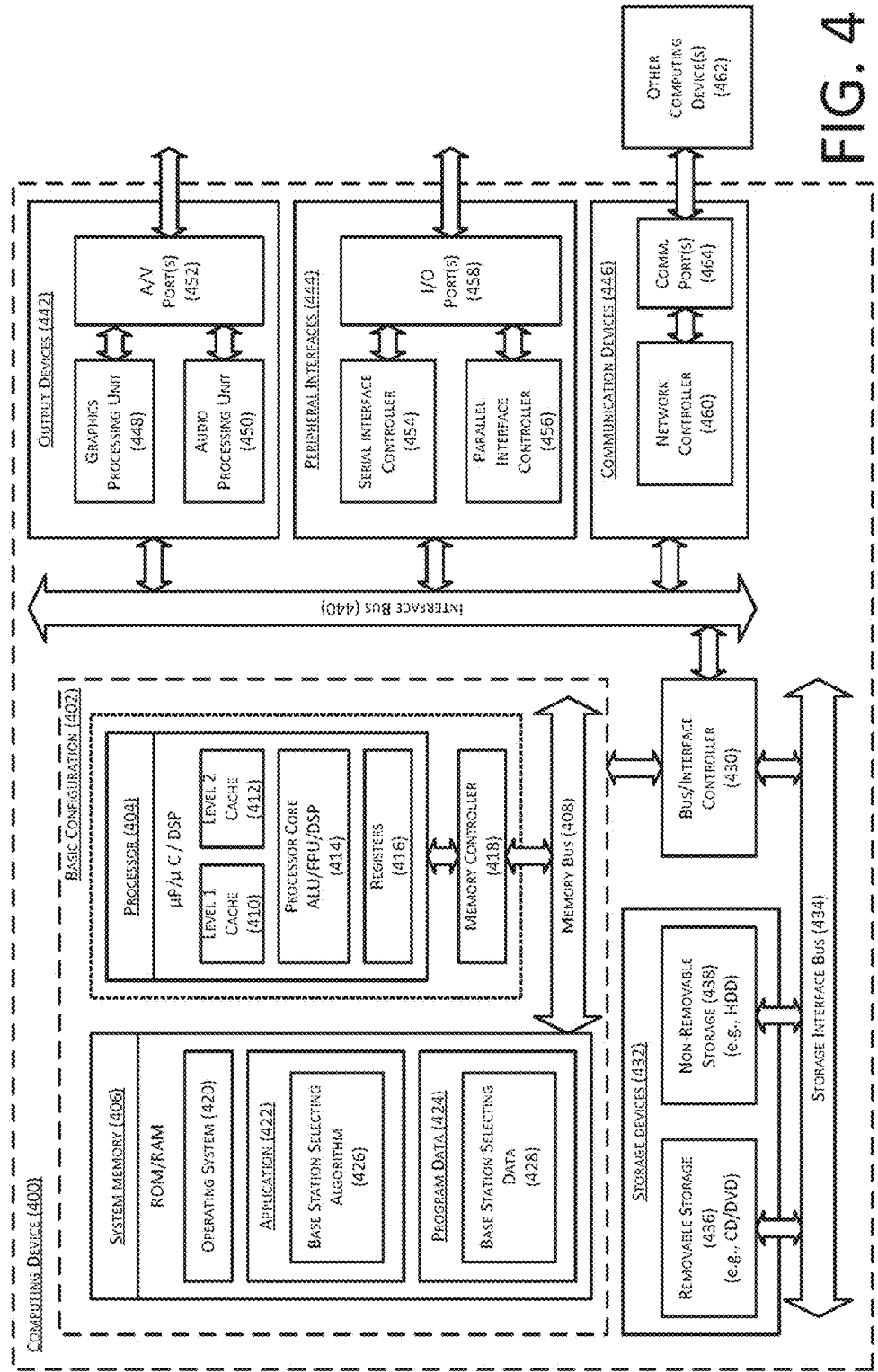
FIG. 4 shows a block diagram illustrating an example computing device that is arranged for adaptively selecting from among multiple base stations, all arranged in accordance with at least some embodiments described herein.

FIG. 4 shows a block diagram illustrating an example computing device that is arranged for adaptively selecting between multiple base stations, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a base station selecting algorithm 426 that is arranged to perform the functions as described herein including those described with respect to process 300 of FIG. 3. Program data 424 may include base station selecting data 428 that may be useful for operation with base station selecting algorithm 426 as is described herein. In some embodiments, application 422 may be arranged to operate with program data 424 on operating system 420 such that implementations of base station selecting may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A wireless communication system, comprising:
a first base station;
a second base station; and
a mobile communication device that includes a processor, and multiple antennae in communication with the first base station and the second base station, wherein the processor is configured to:
responsive to a standard impulse signal transmitted via a respective one of first channels and second channels by a respective one of the first base station and the second base station, measure an impulse response of each of the first channels between the multiple antennae and the first base station, and an impulse response of each of the second channels between the multiple antennae and the second base station;
calculate an integral of a respective one of the impulse responses for each of the first channels and each of the second channels, during a time period;
compute, based on the calculated integrals, a respective narrowband channel coefficient of each of the first channels and each of the second channels;
calculate a first weight vector for the impulse responses of each of the first channels, wherein the first weight vector is based on the narrowband channel coefficients of each of the first channels and the narrowband channel coefficients of each of the second channels;
calculate a second weight vector for the impulse responses of each of the second channels, wherein the second weight vector is based on the narrowband channel coefficients of each of the first channels and the narrowband channel coefficients of each of the second channels;

calculate a channel gain for each of the first channels and the second channels in relation to the respective first base station and the second base station;

select the first base station or the second base station as a target base station based on a comparison of the channel gain for each of the first channels and the channel gain for each of the second channels; and control signal transmission, based on the first weight vector and the second weight vector, through one or more of the first channels and the second channels, to the selected first base station or second base station.

2. The wireless communication system of claim 1, wherein, to control the signal transmission to the one or more of the first base station and the second base station, the processor of the mobile communication device is configured to:

direct the signal transmission to the first base station and suppress the signal transmission to the second base station.

3. The wireless communication system of claim 1, wherein the processor of the mobile communication device is further configured to:

determine the maximum channel gain of the channel gain calculated for each of the first channels and the second channels;

direct the signal transmission through one or more respective channels of the first channels, corresponding to the first base station, having the maximum channel gain; and suppress the signal transmission through one or more respective channels of the second channels, corresponding to the second base station, not having the maximum channel gain.

4. The wireless communication system of claim 1, wherein the multiple antennae include a first antenna and a second antenna.

5. The wireless communication system of claim 4, wherein the processor of the mobile communication device is further configured to:

calculate a respective channel gain for each of the first channels and the second channels, based on one or more variables that include the first weight vector in relation to the impulse response which corresponds to the first antenna and the second weight vector in relation to the impulse response which corresponds to the second antenna.

6. A method of beam-forming by a mobile communication device, the method comprising:

responsive to a standard impulse signal transmitted via a respective one of first channels and second channels by a respective one of a first base station and a second base station, measuring an impulse response of each of the first channels between multiple antennae of the mobile communication device and the first base station, and an impulse response of each of the second channels between the multiple antennae of the mobile communication device and the second base station;

calculating an integral of a respective one of the impulse responses for each of the first channels and each of the second channels, during a time period;

computing, based on the calculated integrals, a respective narrowband channel coefficient of each of the first channels and each of the second channels for signal transmission to the first base station and the second base station;

calculating, based on each of the respective narrowband channel coefficient of the first channels and the second channels, a respective weight vector for each of the impulse responses of the first channels and the second channels for the multiple antennae;

calculating a channel gain for each of the first channels and the second channels in relation to the respective first base station and the second base station;

selecting the first base station or the second base station as a target base station based on a comparison of the channel gain for each of the first channels and the channel gain for each of the second channels; and controlling the signal transmission, based on the calculated respective weight vector, through one or more of the first channels and the second channels, from the mobile communication device to one or more of the selected first base station or second base station.

7. The method of claim 6, further comprising:

calculating, based on the narrow band channel coefficients and the weight vectors, a respective channel gain for each of the first channels and the second channels;

determining the maximum channel gain of the respective channel gain calculated for each of the first channels and the second channels;

directing the signal transmission, through one or more respective channels, corresponding to the first base station or the second base station, having the maximum channel gain; and suppressing the signal transmission, through one or more respective channels corresponding to the other of the first base station or the second base station.

8. The method of claim 6, wherein:

the multiple antennae includes a first antenna and a second antenna, the measuring the impulse response of each of the first channels comprises measuring an impulse response of one of the first channels between the first antenna and the first base station, and measuring an impulse response of other channel of the first channels between the second antenna and the first base station, and the measuring the impulse response of each of the second channels comprises measuring an impulse response of one of the second channels between the first antenna and the second base station, and measuring an impulse response of other channel of the second channels between the second antenna and the second base station.

9. The method of claim 8, wherein the calculating the respective weight vector comprises:

calculating a first weight vector corresponding to a respective channel between the first base station and the mobile communication device based on the impulse response corresponding to the first antenna, and calculating a second weight vector corresponding to a respective channel between the second base station and the mobile communication device based on the impulse response corresponding to the second antenna.

10. The method of claim 9, further comprising:

calculating a respective channel gain for each of the first channels and the second channels, wherein calculating the respective channel gain includes calculating a channel gain based on one or more variables including the first weight vector in relation to the impulse response corresponding to the first antenna and the second weight vector in relation to the impulse response corresponding to the second antenna.

11. A non-transitory computer-readable medium storing executable instructions for beam-forming by a mobile communication device, wherein the executable instructions in response to execution by one or more processors of the mobile communication device, cause the one or more processors to:
- responsive to a first standard impulse signal transmitted via a first transmission channel by a first base station, measure a first impulse response of the first transmission channel, wherein the first transmission channel corresponds to communication between a first antenna of the mobile communication device and the first base station;
- responsive to a second standard impulse signal transmitted via a second transmission channel by a second base station, measure a second impulse response of the second transmission channel, wherein the second transmission channel corresponds to communication between a second antenna of the mobile communication device and the second base station;
- calculate a first integral of the first impulse response and a second integral of the second impulse response, during a time period;
- compute, based on the first integral and the second integral, a first narrowband channel coefficient of the first transmission channel and a second narrowband channel coefficient of the second transmission channel;
- calculate, based on each of the first narrowband channel coefficient and the second narrowband channel coefficient, a first weight vector for the first base station and a second weight vector of the second base station;
- calculate a channel gain for each of the first transmission channels and the second transmission channels in relation to the respective first base station and the second base station;
- select the first base station or the second base station as a target base station based on a comparison of the channel gain for each of the first channels and the channel gain for each of the second channels; and
- adapt, based on the first weight vector and the second weight vector, signal transmission to the first transmission channel and the second transmission channel, respectively.

12. The non-transitory computer-readable medium of claim 11, wherein the operations further cause the one or more processors to:
- determine a higher channel gain amongst the channel gain of the first transmission channel and the second transmission channel,
- wherein the operation to adapt the signal transmission includes at least one operation to direct signal transmission through the first transmission channel that corresponds to the first base station, and suppress signal transmission through the second transmission channel that corresponds to the second base station, wherein the first transmission channel has the higher channel gain than the second transmission channel.

13. The non-transitory computer-readable medium of claim 11, wherein the first weight vector corresponds to the first transmission channel between the first base station and the mobile communication device based on the first impulse response which corresponds to the first antenna, and the second weight vector corresponds to the second transmission channel between the second base station and the mobile communication device based on the second impulse response which corresponds to the second antenna.

14. The non-transitory computer-readable medium of claim 12, wherein the calculation of the channel gain is performed based on one or more variables that include the first weight vector in relation to the first impulse response with respect to the first antenna, and the second weight vector in relation to the second impulse response with respect to the second antenna.

* * * * *